(No Model.)
R. G. THOMASSON.
POULTRY CRATE.
No. 444,561. Patented Jan. 13, 1891.
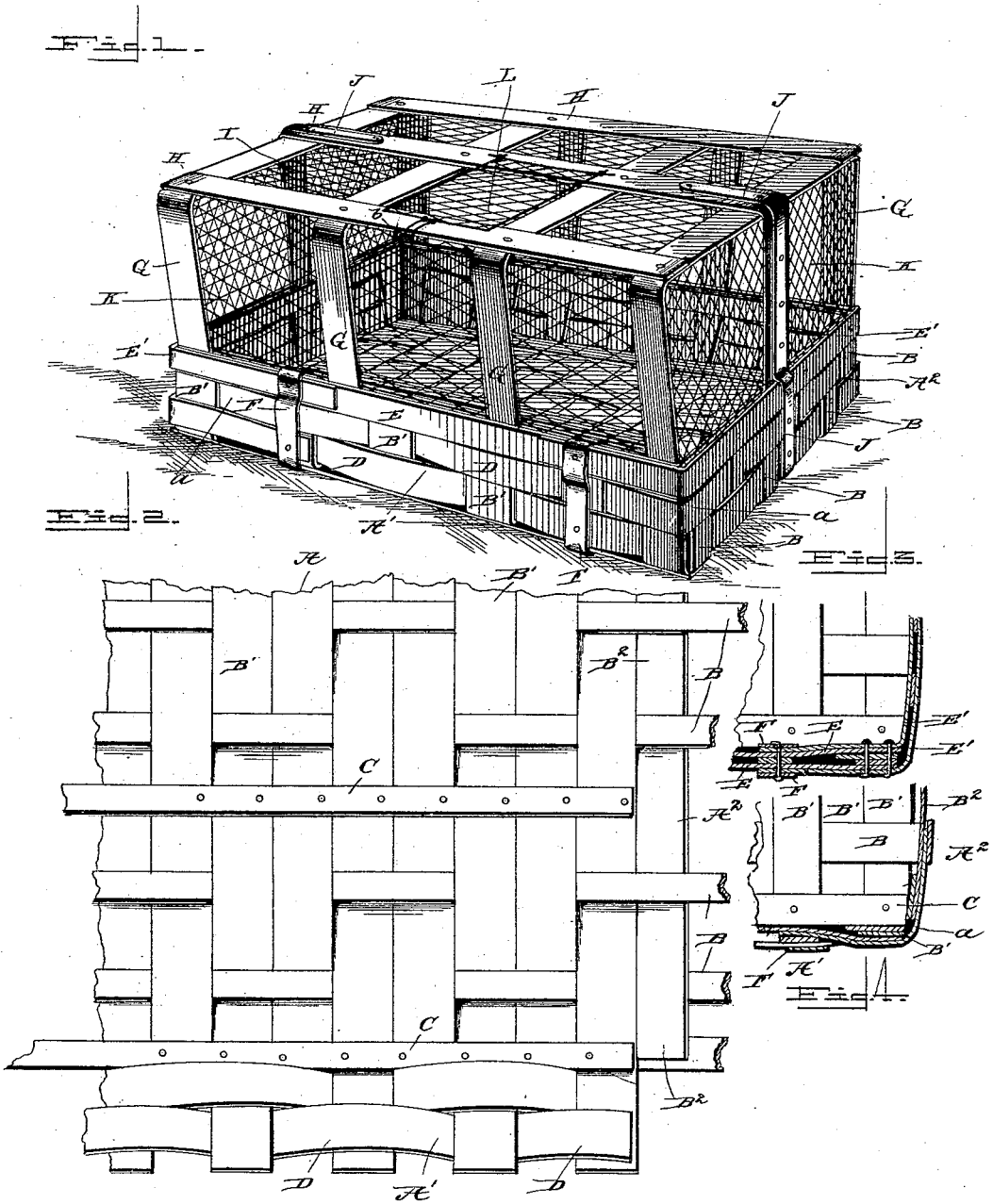
WITNESSES
INVENTOR
Robert G. Thomasson
By J. W. Cister
Attorney

UNITED STATES PATENT OFFICE.

ROBERT G. THOMASSON, OF BUMPASS, VIRGINIA.

POULTRY-CRATE.

SPECIFICATION forming part of Letters Patent No. 444,561, dated January 13, 1891.

Application filed October 9, 1890. Serial No. 367,546. (No model.)

*To all whom it may concern:*

Be it known that I, ROBERT G. THOMASSON, a citizen of the United States, residing at Bumpass, in the county of Louisa and State of Virginia, have invented certain new and useful Improvements in Chicken-Coops; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to a new and improved chicken or poultry coop, more especially designed for shipping purposes, combining strength and durability, and yet being easily and cheaply constructed; and to these ends the invention consists in the novel construction and combination of the parts, as hereinafter disclosed.

In the accompanying drawings, Figure 1 is a perspective view of my improved chicken or poultry coop. Fig. 2 is a plan view of the part, mostly of wood, or wicker-work portion constituting, principally, the bottom and its upturned side and end portions in their initial state or prior to the bending and securing of the same in their final shape. Fig. 3 is a detailed horizontal sectional view mainly taken through an end portion of the latter; and Fig. 4 is a horizontal section, also, of the latter part.

In carrying out my invention I form the bottom A, with its normally-upturned side and end portions A' A², respectively of longitudinal and transverse thin narrow strips or laths B B' B², preferably of ash or other pliable readily-bent wood. These strips are interlaced or interwoven after the fashion of "wicker" or basket work, the transverse strips thereof being preferably arranged two together, side by side. This renders the bottom more solid, lessening interstices wherein the feet or legs of the fowl are liable to be caught, and whereby the number of longitudinal strips used is greatly reduced or lessened. Along the center and side edges of the thus interwoven or interlaced bottom part A, both upon the upper and lower surfaces thereof, are nailed or fastened re-enforcing pieces or slats C C. These do not, however, extend along or up the end portions A² A². The transverse strips B', it will be seen, are extended or continued beyond the side edge slats or pieces C C and interwoven or interlaced with short longitudinal strips D D to constitute or form the side portions A'. The short transverse strips B², forming, with the long longitudinal strips B of the bottom, the end portions A² A², it will be seen, are not interwoven with or continuations or extensions of the longitudinal strips of the side portions A' A'. Therefore as the said side and end portions A' A² are bent up and caused to meet at their corner edges their connection can be and is effected in part by means of short (otherwise waste) pieces or strips $a$, suitably bent around said corner edges and fastened, preferably, by nails to the upturned portions of the transverse end strips B of the bottom A. The ends of the short pieces $a$ $a$ are tucked under other upturned transverse strips of the side portions A' and under upturned longitudinal strips of the end portions A², thus being firmly held in place. By this arrangement the employment of long or usual-sized end strips heretofore interwoven or interlaced with the side strips is also dispensed with. The top edges of the end and side portions A' A² are each sandwiched between and have fastened or nailed to them opposite strips E E', respectively. The top edge pieces or strips E are just the length of the side portions A'; but the top edge pieces E' extend a short distance beyond the end portions A² and lap and are secured by nails, preferably, to both sides of the aforesaid strips E.

F F are pieces or strips of metal, preferably "hoop-iron," applied to the side portions A' near the corners, the upper ends of said metal strips or pieces overlapping the top edges of the strips E where they lap the strips E' and secured thereto, while the lower ends of said metal strips underlap and are secured to the underneath side bottom pieces C C.

G G are bows secured to the side portions A', at the ends thereof and at suitable intervals along the same between the opposite top edge pieces or strips E, by nails or otherwise. These bows have secured to them upon their top surfaces longitudinal connecting and staying pieces or braces H, while the end bows are themselves secured about at the center to the upper ends of upright pieces or stays I. J J are also metal strips, preferably hoop-iron, strengthening or re-enforcing and secured to the end uprights or stays I and to the end portions $A^2$ and to the top and bottom central pieces or braces H and C, along which pieces they may be extended, if desired, their entire length. The bows, with their connecting pieces or braces, are covered with a firm wire-netting K, secured to the top edge pieces E E' of the side and end portions of the coop in any suitable way. In this netting or cover is an opening, through which convenient access is had to the coop, closed by a door L, formed of a strong wire frame, itself covered by a wire-netting and hinged to the central brace or piece H of the bows G, said door having a bent looped wire fastening $b$, engaging a side brace or piece of said bows and securing the door in a closed position.

This coop, especially designed for shipping chickens or poultry, it will be seen, is strong and durable and is readily and cheaply constructed.

Having thus fully described my invention, what I claim, and desire to secure by Letters Patent, is—

1. The chicken coop or crate comprising the bottom having the side and end projecting portions forming the normally-upturned portions or sides and ends of the coop connected together by the short tucked-in corner pieces or strips, and the inner and outer opposite strips or pieces lapping and secured to the top edge strips of the sides and suitably re-enforced thereat, substantially as and for the purpose set forth.

2. The chicken-coop consisting of the bottom wicker-work portion having side and end portions held together as described, and having upper and lower bottom re-enforcing pieces or strips, also re-enforcing metallic pieces or strips near their corner edges, the wire-netting-covered bows with their braces or stays, said bows being secured to said bottom portion, the upright stays or braces secured to said bottom portion, and the end bows and the re-enforcing metal pieces secured to said upright stays and to said bottom portion and to the central top brace of said bows and the central underneath strip or brace of said bottom portion, substantially as set forth.

In testimony whereof I affix my signature in presence of two witnesses.

ROBERT G. THOMASSON.

Witnesses:
R. B. McCANDLISH,
JOHN RUNQUIEST.